United States Patent Office 3,318,198
Patented May 9, 1967

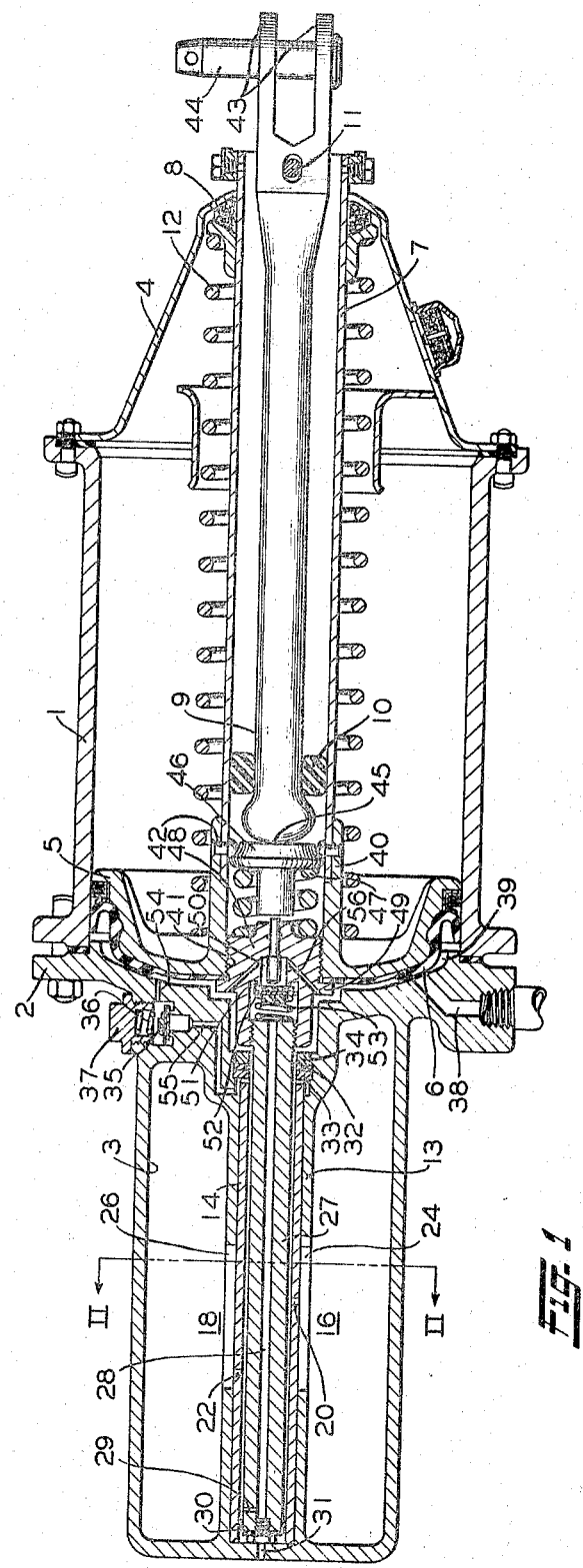

3,318,198
BRAKE CYLINDER HAVING AUTOMATIC VOLUME CONTROL AS RELATED TO PISTON TRAVEL
George K. Newell, Penn Township, Westmoreland County, Pa., assignor to Westinghouse Air Brake Company, Wilmerding, Pa., a corporation of Pennsylvania
Filed June 30, 1965, Ser. No. 468,318
6 Claims. (Cl. 91—401)

This invention relates to brake cylinders of the type employed in fluid pressure brake systems for railway cars and trains and, in particular, to an improved type of brake cylinder wherein the volume of the pressure chamber of the brake cylinder is selectively and progressively varied as piston travel increases with wear of brake shoes to provide minimum variation of braking pressure for a given degree of brake pipe pressure reduction.

It is well known to those skilled in the art that the increase in the volume of the pressure chamber of a brake cylinder, occasioned by an increase in piston travel due to brake shoe wear, results in a corresponding reduction in braking pressure. This reduction in braking pressure is occasioned by the fact that the pressure of equalization between the auxiliary reservoir and the brake cylinder reduces with the increasing volume in the pressure chamber of the brake cylinder.

Conventionally, various types of slack adjusters are employed for automatically adjusting the piston travel as brake shoe wear occurs so that a nominal standard piston travel occurs, thereby providing assurance of substantially uniform braking pressures for a given reduction in brake pipe pressure, notwithstanding an increase of brake shoe wear.

Slack adjusters are, however, subject to the disadvantage of being exposed to weather conditions and also represent a substantial cost in addition to that of the brake equipment itself.

It is the purpose of the present invention to provide a brake cylinder of novel design wherein the variation in piston travel due to brake shoe wear is utilized to selectively and automatically vary an auxiliary volume communicating with the pressure chamber of the brake cylinder, whereby a substantially uniform braking pressure for a given brake pipe reduction is attained without the use of slack adjusters.

According to the invention, the usual pressure head of the brake cylinder is replaced by a special design of head having a cylindrical extension embodying a plurality of separate volumes. Selective communication between the volumes and the pressure chamber of the brake cylinder is established through the medium of a plunger type valve connected to and movable with the brake cylinder piston itself. Initially, with new brake shoes and a minimum piston travel, the maximum number of volumes in the pressure head extension communicate with the pressure chamber of the brake cylinder and these volumes are successively and progressively closed off from communication with the pressure chamber of the brake cylinder as the piston travel increases due to wear of the brake shoes, thereby compensating for the increase in volume of the pressure chamber in consequence of greater piston travel. With this apparatus, the need for slack adjusters is thus obviated.

In the accompanying drawings, FIG. 1 is a longitudinal section view of the novel brake cylinder comprising the invention, and FIG. 2 is a sectional view, taken on the line II—II of FIG. 1, showing additional details of the auxiliary volumes.

Referring now to the drawings, the invention comprises a conventional form of brake cylinder body 1 having a novel pressure head 2 attached at one end of the cylinder body in place of the usual form of pressure head. Pressure head 2 has a cylindrical extension integral therewith which has an outer wall 3, the purpose of which will be hereinafter more fully described. At the other end of the cylinder body is a conventional form of non-pressure head 4 which is attached thereto as by bolts. Inside the cylinder body 1 is a piston 5 having a packing cup 6, of the well-known snap-on type, fitted to its pressure face.

Attached coaxially to the piston is a sleeve 7 which extends through an opening in the non-pressure head 4 and is guided in the said opening by a bushing 8 fitted therein. A conventional push rod 9 is supported concentrically inside the sleeve by a bushing 10 at its inner end and at its other end by a lost-motion connection 11. A conventional release spring 12 is interposed between a metallic collar or seat at one end of the bushing 8 and the non-pressure face of piston 5.

The forementioned cylindrical extension of pressure head 2 comprises an outer cylindrical wall 3 and a coaxial central tube 13 having a bore within which liner 14 is secured as by a press fit. The central tube 13 has four rectangular-shaped partition members extending in angularly-spaced relation radially outwardly to the inside of wall 3 of said cylindrical wall thus forming four separate chambers 15, 16, 17 and 18, respectively. The aforementioned internal liner 14 has four orifices 19, 20, 21 and 22 therein which are staggered longitudinally and circumferentially spaced about 90° apart. Central tube 13 has four longitudinal slots 23, 24, 25 and 26 of equal length and spaced circumferentially about 90° apart so that each one of said orifices is in registry with one of the slots via which it communicates with a corresponding one of said chambers, respectively. The aforementioned central tube 13 has its respective slots of sufficient length that any one of said four orifices in said liner 14 can be in registry with any one of the four orifices in the central tube 13, and thus with any one of said chambers.

A plunger or tube 27 has a packing 30 at one end thereof and operates within the bore of the liner 14. The plunger 27 has a central bore 28 which is connected by a port 29 to the annular space surrounding the plunger 27. The plunger extends through and is guided at the opposite end by packing ring 32 secured in pressure head 2 between a collar 33 and an annular screw plug 34. Screw plug 34 is screwed into a counterbore portion of the bore of central tube 13 which opens into a pressure chamber 39 formed between the recessed inner face of pressure head 2 and the piston packing cup on piston 5.

Contained in a suitable chamber formed in the cylinder head is a check valve 35 yieldingly biased by a spring 36 into sealed relation with an annular valve seat formed at one end of the chamber. The inner seated or inner sealed area of valve 35 communicates by way of a passage 55 with the annular space surrounding the plunger 27. The chamber containing valve 35 communicates by way of a port 54 with the pressure chamber 39. Check valve 35 acts as a pressure relief valve via which to equalize pressure in the one or more of said four chambers 15–18 and the pressure chamber 39 and release fluid under pressure therefrom coincidentally with release of fluid under pressure from pressure chamber 39. A port and passage 38 in pressure head 2 serves to supply fluid under pressure to and release fluid under pressure from pressure chamber 39. Passage 31 at the left end of the cylindrical extension, as viewed in FIG. 1, also permits air to enter and exhaust when plunger 27 reciprocates, thus facilitating its easy movement free from the compression and suction force of a closed cylinder.

Piston 5 has a central boss or hub 40 through which extends a bore 41 which is internally threaded at the packing cup end thereof. The inner end of the bore is counterbored to receive sleeve 7 which is secured to the hub 40 as by a plurality of rivets 42. Sleeve 7 extends through a central opening in the non-pressure head 4 and is adapted to reciprocate within the bushing or bearing 8. The push rod 9 has at one end a conventional bifurcated member 43 and a gudgeon 44 for connecting the push rod to an actuating lever of conventional brake rigging, whereby brake shoes are shifted into and out of braking engagement with the wheel tread. The inner end 45 of the rod 9 is rounded and abuts a grooved follower 46 which is biased into seated position on rivets 42 by a spring 47 compressed between a threaded plug 48 in the bore 41 and follower 46. A flange 49 on plug 48 secures the inner periphery of the packing cup 6 to the pressure face of the piston 5.

The plug 48 has a central bore threaded at one end thereof into which the end of the plunger 27 is screwed, thereby causing the plunger to reciprocate with the piston 5. A portion of the bore in the plug 48 forms a chamber containing a disc valve 52 that is biased into seated position on an annular valve seat 51 formed on a shoulder in the bore, by a spring 53 interposed between the end of plunger 27 and the valve 52. A rod or pin 50 slidingly supported in a bore of the plug 48 coaxial to the plug and push rod 9 protrudes beyond the end of the plug and is adapted to be engaged by the said follower 46, as more fully described hereafter, to effect unseating of valve 52. The chamber formed at the inner seated area of the valve 52 communicates by way of a plurality of passages 56 with the pressure chamber 39.

The operation of the brake cylinder is as follows:

When the brake pipe pressure is decreased and the conventional brake controlling valve on the car correspondingly supplies fluid under pressure from the usual auxiliary reservoir (not shown) to port 38 and pressure chamber 39, the force exerted by the fluid under pressure on the pressure face of the piston shifts the piston in a right-hand direction, as viewed in FIG. 1, thus actuating the brake shoes (not shown) into braking contact with the tread of corresponding wheels. If the brake shoes are unworn, the piston 5 will travel normally about five inches from the release position in which it is shown in FIG. 1, before the shoes will contact the wheel tread. The push rod 9 will thus be stopped, but sleeve 7, piston 5, plug 48 and tube 27 will continue to move slightly in the right-hand direction due to the lost-motion connection 11 which links rod 9 and sleeve 7 together. As this occurs, the inside or rounded edge 45 of the rod 9, which is now static because of the brake shoe being tight against the tread surface of the car wheel, will contact the follower 46 unseating it from its seat rivets 42 and overcoming the force of spring 47. Follower 46 thus engages and moves pin 50, overcoming the force of valve spring 53 and unseating valve 52. Fluid under pressure thus flows past the unseated valve 52 into the bore 28 and by way of port 29 of plunger 27, ports 19–22 and slots 23–6 into the four chambers 15–18, respectively.

When fluid under pressure is released from the pressure chamber 39 by way of port 38 incidental to release of the brakes, the fluid under pressure in the four chambers is concurrently released by flow from the chambers reversely by way of slots 23–26, ports 19–22, into the annular space between liner 14 and tube 27, passage 55, past check valve 35 to chamber 39. With release of fluid under pressure from the pressure chamber 39, return spring 12 restores the piston 5 and the push rod 9 back in the left-hand direction, as viewed in FIG. 1, to the position in which they are shown, corresponding to a release position of the brake shoes.

Assuming the brake shoes wear down slightly from attrition and the piston travel correspondingly increases to about six inches from the release position in which it is shown in FIG. 1 before the brake shoes contact the tread of the wheel, the following operation occurs. As before, when push rod 9 stops due to contact of the brake shoes with the wheel treads, sleeve 7, piston 5, plug 48 and tube 27 continue to move slightly, due to the lost-motion connection 11 which links rod 9 and sleeve 7. As this occurs, the rounded end 45 of rod 9, which is now static, will contact follower 46 unseating it from rivets 42 against the force of spring 47 as before. Follower 46 engages pin 50 and overcoming spring force 53 unseats valve 52 as before, thus letting fluid under pressure flow past the unseated valve 52 into bore 28, and via port 29 of plunger 27, ports 19–21, and slots 23–25 into only three chambers 15–17, respectively. It will be noted that travel of tube 27 incident to this increased travel of piston 5 is such that packing 30 has passed port 22 due to its increased reciprocation of one inch, thus connecting chamber 18 to atmosphere and venting the fluid pressure therefrom via port 31. When fluid under pressure is released from the pressure chamber 39 by way of port 38 incidental to release of the brakes, the fluid under pressure in the three remaining chambers will flow from the chambers by way of their respective and communicating slots and ports, past valve 35 and subsequently into chamber 39 and out via port 38. The release or return spring 12 concurrently restores the piston 5 and consequently the rod 9 back in the left-hand direction, as viewed in FIG. 1, to the position in which they are shown corresponding to a release position of the brake shoe.

As the brake shoes continue to wear further, the piston will correspondingly travel an increasing distance from the release position in which it is shown, upon successive brake applications, before the brake shoe contacts the wheel periphery. As before, when valve 52 is unseated on each application, fluid under pressure flows into a lesser number of the chambers 15, 16 and 17 progressively, depending on the extent of travel of tube 27, the chambers not charged correspondingly with the pressure chamber 39 being vented to atmosphere past the packing 30 and via port 31.

It will be understood, therefore, that the novel brake cylinder device described herein automatically compensates for the increase in brake cylinder pressure chamber volume resulting from increased piston travel due to increased brake shoe wear, by successively disconnecting an increasing number of the chambers 15 to 18 from communication with the brake cylinder pressure chamber. In other words, the total equalization volume in the brake cylinder device remains substantially constant over the range of piston travel, and thus the fluid pressure established in the brake cylinder effective to cause a brake application remains substantially constant regardless of brake shoe wear. Thus, the equivalent result is accomplished as with slack adjusters, the need for which is thereby obviated.

Although a specific embodiment of the invention has been shown and described, it is with full awareness that modifications thereof are possible.

Having now described the invention, what I claim as new and desire to secure by Letters Patent, is:

1. In a brake cylinder means,
    (a) a cylinder means,
    (b) a pressure head connected to said cylinder means and having a pressure chamber, to which fluid under pressure is supplied and released via an intake and exhaust means, and a central bore,
    (c) a non-pressure head connected to said cylinder means and having a central orifice,
    (d) a psiton means slidable in said cylinder means and having a central orifice means therein,
    (e) tube means fixed to said orifice means and extending through the said orifice of said non-pressure head,
    (f) rod means concentric to said tube means,
    (g) lost-motion means between said rod means and said tube means,
    (h) valve means, secured in the said orifice means, which abuts said rod means and extends into and communicates with said central bore of said pressure head, said valve means including a normally seated valve which is unseated by lost-motion movement between the said rod means and said tube means incidental to movement of said piston means out of a normal position, (i) chamber means in said pressure head surrounding said central bore, (j) sleeve means coaxial to said valve means and fitted into the central bore, (k) another tube means coaxial with and secured to said valve means, (l) passage means communicating said valve means with said intake and exhaust means, (m) another passage means communicating said chamber means and said valve means through said sleeve means and said another tube means and controlled by said another tube means which is concentric to and internal of said sleeve means whereby the said another tube means closes off communication with select sections of said chamber means successively and prevents flow of fluid under pressure to the said sections past the valve of said valve means, as travel said piston means out of a normal position inside said cylinder means increases thus compensating for the volume increase in the pressure chamber due to the increasing travel of said piston means.

2. In combination:

(a) brake cylinder means having therein a piston subject to fluid under pressure in a pressure chamber at one side thereof to move out of a brake release position in a direction to effect a brake application, (b) means providing a plurality of separate chambers, (c) normally closed valve means operable by movement of the brake cylinder piston incidental to a brake application to establish communication between said chambers and the pressure chamber of the brake cylinder, and (d) valve means actuable in accordance with the travel of the brake cylinder piston to disconnect progressively an increasing number of said chambers in said chamber means from the pressure chamber of the brake cylinder as the piston travel increases due to brake shoe wear.

3. The combination as claimed in claim 2, characterized in that the brake cylinder is provided with a pressure head having the said chamber means embodied therein.

4. The combination as claimed in claim 2, further characterized in that the brake cylinder means is provided with a pressure head having a cylindrical extension coaxial to the longitudinal axis of the brake cylinder means and in which are the chambers provided by said chamber means, said cylindrical extension having a central tubular member and a spool-type valve contained therein connected to and operated by movement of the brake cylinder piston to selectively communicate said chambers with the pressure chamber of the brake cylinder in accordance with the travel of the brake cylinder piston.

5. The combination as claimed in claim 4 wherein the spool valve means is effective to vent said chambers to atmosphere concurrently with disconnection from the pressure chamber of the brake cylinder.

6. The combination as claimed in claim 4, characterized by a check valve means in a communication between said pressure chamber and said chambers whereby to release fluid under pressure from said chambers concurrently with the release of fluid under pressure from the pressure chamber of the brake cylinder means.

References Cited by the Examiner

FOREIGN PATENTS 214,636  11/1924  Great Britain.

MARTIN P. SCHWADRON, *Primary Examiner.*

P. T. COBRIN, P. E. MASLOUSKY,

*Assistant Examiners.*